United States Patent
Koma et al.

(10) Patent No.: US 6,509,944 B2
(45) Date of Patent: *Jan. 21, 2003

(54) VERTICALLY ALIGNED LIQUID CRYSTAL DISPLAY WITH IMPROVED VIEWING CHARACTERISTICS

(75) Inventors: Norio Koma, Gifu (JP); Tetsuji Omura, Gifu (JP); Kiyoshi Yoneda, Gifu (JP)

(73) Assignee: Sanyo Electric Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/163,083

(22) Filed: Sep. 29, 1998

(65) Prior Publication Data

US 2002/0021395 A1 Feb. 21, 2002

(30) Foreign Application Priority Data

Oct. 1, 1997 (JP) .............................................. 9-268976

(51) Int. Cl.[7] ...................... G02F 1/1343; G02F 1/1337
(52) U.S. Cl. ........................ 349/139; 349/130; 349/143; 349/144
(58) Field of Search ................................. 349/144, 143, 349/139, 130

(56) References Cited

U.S. PATENT DOCUMENTS

| 5,084,778 | A | | 1/1992 | DeJule et al. | |
|---|---|---|---|---|---|
| 5,136,407 | A | * | 8/1992 | Clerc | ............................ 359/55 |
| 5,229,873 | A | | 7/1993 | Hirose et al. | |
| 5,309,264 | A | * | 5/1994 | Lien et al. | ...................... 359/87 |
| 5,608,556 | A | | 3/1997 | Koma | |
| 5,666,179 | A | * | 9/1997 | Koma | ......................... 349/143 |
| 5,726,721 | A | * | 3/1998 | Sumiyoshi et al. | ............ 349/54 |
| 5,748,275 | A | * | 5/1998 | Sate et al. | ................... 349/144 |
| 5,808,712 | A | | 9/1998 | Hishida et al. | |
| 5,825,448 | A | | 10/1998 | Bos et al. | |
| 5,855,968 | A | | 1/1999 | Hirata et al. | |
| 5,859,683 | A | | 1/1999 | Tagusa et al. | |
| 6,215,542 | B1 | * | 4/2001 | Lee et al. | .................... 349/143 |
| 6,229,589 | B1 | * | 5/2001 | Koma | ......................... 349/129 |

FOREIGN PATENT DOCUMENTS

| EP | 0603866 A1 | | 6/1994 |
|---|---|---|---|
| EP | 0751417 A1 | | 1/1997 |
| EP | 0766119 A1 | | 4/1997 |
| JP | 3-111818 | | 5/1991 |
| JP | 4-319920 | | 11/1992 |
| JP | 5-210114 | | 8/1993 |
| JP | 6-130394 | | 5/1994 |
| JP | 6-194656 | | 7/1994 |
| JP | 6-194657 | | 7/1994 |
| JP | 09-236814 A | * | 9/1997 |

OTHER PUBLICATIONS

Yamamoto et al., Full–Cone Wide–Viewing Angle Multi-color CSH–LCD, SID 91 Digest, pp. 762–765, 1991.

* cited by examiner

Primary Examiner—William L. Sikes
Assistant Examiner—Tarifur R. Chowdhury
(74) Attorney, Agent, or Firm—Hogan & Hartson, LLP

(57) ABSTRACT

A vertically aligned type liquid crystal display includes a liquid crystal layer disposed between a plurality of pixel electrodes and a common electrode and containing vertically aligned liquid crystal molecules, the orientation of the liquid crystal molecules being controlled by electric field. An orientation control window is formed in the common electrode. A distance Wp between adjacent pixel electrodes and/or a width Ws of the orientation control window is selected so as to satisfy $Wp \geq d/2$ and/or $Ws \geq d/2$, where d is a distance (or a cell gap) between the pixel electrodes and the common electrode. Viewing angle is widened and a viewing angle characteristic is improved, and abnormal orientation or grittiness of an image is eliminated.

5 Claims, 7 Drawing Sheets

VERTICALLY ALIGNED LIQUID CRYSTAL DISPLAY WITH IMPROVED VIEWING CHARACTERISTICS

BACKGROUND OF THE INVENTION

1. Field of the Invention

The present invention relates to a liquid crystal display (LCD) which utilizes opto-electric anisotropy of liquid crystal and more particularly, to a liquid crystal display which achieves an improved viewing angle characteristic or eliminates gritty images.

2. Description of the Related Art

LCDs are compact, thin, and low power consumption devices and have been developed for practical use in the field of office automation (OA) and audio-visual (AV) equipment. In particular, active matrix type LCDs which utilize thin film transistors (TFTS) as switching elements are theoretically capable of static actuation at a duty ratio of 100% in a multiplexing manner, and have been used in large screen and high resolution type animation displays.

TFTs are field effect transistors arranged in a matrix on a substrate and connected to individual pixel electrodes which form one side of pixel capacitors with a dielectric layer made of liquid crystal. In a TFT matrix, TFTs located on a same row are simultaneously turned on/off by a given gate line, and each TFT of that row receives a pixel signal voltage from a given drain line. A display voltage is accumulated in the pixel capacitors corresponding to the on-state TFTs and designated by rows and columns. The pixel electrodes and the TFTs are formed on the same substrate, while a common electrode acting as the other side of the pixel capacitors is formed on the entire surface of the second substrate opposite to the first substrate across the liquid crystal layer. That is, the display pixels (i.e., pixels) are defined by partitioning the liquid crystal and the common electrode by pixel electrodes. The voltage accumulated in the pixel capacitors is held insulated by an off-state resistance of the TFTs for one field period or one frame period until the TFTs are turned on again. The liquid crystal is opto-electrically anisotropic, and its transmittance is controlled based on the voltage applied to respective pixel capacitors. The transmittance of each display pixel is independently controlled, so that individual pixels are observed bright or dark and recognized collectively as a display image by human eyes.

Initial orientation of the liquid crystal is determined by an orientation film disposed at the interface between the liquid crystal and each substrate. For example, a twisted nematic (TN) type LCD uses the liquid crystal in nematic phase which has positive dielectric anisotropy and whose alignment vectors are twisted 90 degrees between opposing substrates. Typically, a polarizing plate is provided on the outside of each substrate, and an polarizing axis of each polarizing plate coincides with the orientation of the liquid crystal located in the vicinity of the corresponding substrate. When no voltage is applied, linearly polarized light passes through one polarizing plate, turns its direction in the liquid crystal layer along the twisted alignment of the liquid crystal, and exits from the other polarizing plate, resulting in a "white" display. When the voltage is then applied to the pixel capacitors, an electric field is created within the liquid crystal and the orientation of the liquid crystal is changed to be parallel to the direction of the applied electric field because of dielectric anisotropy. This results in the collapse of twisted alignment and less frequent turns of the linearly polarized incoming light in the liquid crystal. Consequently, the amount of light ejecting from the other polarizing plate is reduced and the display gradually becomes black. This is known as a normally white mode which is widely applied in the field of TN cells, in which the display is white when no voltage is applied and changes to "black" upon application of the voltage.

FIGS. 1 and 2 show a unit pixel structure of a conventional liquid crystal display, wherein FIG. 1 is a plan view and FIG. 2 is a sectional view along line G—G of FIG. 1. A gate electrode 101 made of a metal, such as Cr, Ta, or Mo, is formed on a substrate 100, and a gate insulating film 102 made of, e.g., SiNx and/or $SiO_2$ is formed to cover the gate electrode 101. The gate insulating film 102 is covered with a p-Si film 103 in which an implantation stopper 104 is used to form a lightly doped region (LD) having a low concentration (N−) of impurities, such as P or As, and source and drain regions (S, D) having a high concentration (N+) of impurities located outside the LD region. A region located immediately below the implantation stopper 104 is an intrinsic layer which includes substantially no impurities and acts as a channel region (CH). The p-Si 103 is covered with an interlayer insulating film 105 made of SiNx or the like. A source electrode 106 and a drain electrode 107, both made of a material such as Al, Mo, or the like, are formed on the interlayer insulating film 105, each electrode being connected to the source region S and the drain region D, respectively, via a contact hole CT1 formed in the interlayer insulating film 105. The entire surface of the thus formed TFT is covered with a planarization insulating film 108 made of SOG (spin on glass), BPSG (boro-phospho silicate glass), acrylic resin, or the like. A pixel electrode 109 made of ITO (indium tin oxide) or the like is formed on the planarization insulating film 108 for actuating the liquid crystal, and is connected to the source electrode 106 via a contact hole CT2 formed in the planarization insulating film 108.

An orientation film 120 formed by a macro molecular film, such as polyimide, is disposed on the entire surface on the above elements and undergoes a rubbing treatment to control an initial orientation of the liquid crystal. Meanwhile, a common electrode 131 made of ITO is formed on the entire surface of another glass substrate 130 arranged opposite to the substrate 100 across a liquid crystal layer. The common electrode 131 is covered with an orientation film 133 made of polyimide or the like and undergone rubbing.

As shown herein, a DAP (deformation of vertically aligned phase) type LCD uses a nematic phase liquid crystal 140 having negative dielectric anisotropy, and orientation films 120, 133 formed by a vertical orientation film. The DAP type LCD is one of the electrically controlled birefringence (ECB) type LCDs which use a difference of refractive indices of longer and shorter axes of a liquid crystal molecule, so-called a birefringence, to control transmittance. In the DAP type LCD, upon application of a voltage, an incoming light transmits one of two orthogonal polarization plates and enters the liquid crystal layer as a linearly polarized light, and is birefracted in the liquid crystal to become an elliptically polarized light. Then, retardation, which is a difference of phase velocity between ordinary and extraordinary ray components in the liquid crystal, is controlled according to an intensity of the electric field of the liquid crystal layer to allow the light to be emitted from the other polarization plate at a desired transmittance. In this case, the display is in a normally black mode, since the display is black when no voltage is applied and changes to white upon application of an appropriate voltage.

As described above, the liquid crystal display displays an image at an intended transmittance or color phase by applying a desired voltage to the liquid crystal sealed between a pair of substrates having predetermined electrodes formed thereon and by controlling a turning route or a birefringence of light in the liquid crystal. Specifically, the retardation is controlled by changing the alignment of the liquid crystal, to thereby adjust the light intensity of the transmitted light in the TN mode, while allowing the separation of color phases in the ECB mode by controlling a spectroscopic intensity depending on wavelength. Since the retardation depends on the angle between the longer axis of the liquid crystal molecule and the orientation of the electric field, the retardation still changes relative to the viewer's observation angle, i.e., a viewing angle, even when such an angle is primarily controlled by the adjustment of the electric field intensity. As the viewing angle changes, the light intensity or the color phase of the transmitted light also changes, causing a so-called viewing angle dependency problem.

Problems of decreased transmittance and slower response speed also remain.

SUMMARY OF THE INVENTION

The present invention is made to solve the above problems and provides a vertically aligned type liquid crystal display including a vertically aligned liquid crystal layer disposed between a plurality of pixel electrodes and a common electrode, wherein the orientation of the liquid crystal layer is controlled by electric field, and wherein a relationship between a gap d formed between each of the plurality of pixel electrodes and the common electrode and a separation distance Wp between individual pixel electrodes satisfies $$Wp \geq d/2$$

In another aspect of the present invention, a vertically aligned liquid type crystal display includes a vertically aligned liquid crystal layer disposed between a plurality of pixel electrodes and a common electrode, the alignment of the liquid crystal layer being controlled by electric field, an orientation control window formed in the common electrode in an area corresponding to each of the plurality of pixel electrodes, wherein a gap d formed between each of the plurality of pixel electrodes and the common electrode and a width Ws of an orientation control window satisfies $$Ws \geq d/2$$

In still another aspect of the present invention, a vertically aligned type liquid crystal display includes a vertically aligned liquid crystal layer disposed between a plurality of pixel electrodes and a common electrode, wherein the orientation of the liquid crystal layer being controlled by electric field, an orientation control window formed in the common electrode in an area corresponding to each of the plurality of pixel electrodes, and wherein a relationship between a gap d formed between each of the plurality of pixel electrodes and the common electrode, and a separation distance Wp between pixel electrodes and a width Ws of an orientation control window satisfies $$Wp \geq d/2 \text{ and } Ws \geq d/2$$

According to the present invention, a viewing angle characteristic is improved and abnormal orientation is prevented, whereby a disclination line appears at the same position in each pixel. This helps eliminating so-called "grittiness" of an image.

As is apparent from the above description, a distance between pixel electrodes and/or a width of the orientation control window are selected so as to satisfy $Wp \geq d/2$ and/or $Ws \geq d/2$, where Wp represents a distance between pixel electrodes, d represents a distance between the pixel electrodes and the common electrode, and Ws represents a width of the orientation control window. This prevents the occurrence of abnormal orientation and eliminates image grittiness.

In another aspect of the present invention, each pixel electrode has an aspect ratio (i.e., a vertical to horizontal length ratio) of at least (equal to or more than) 2.

The orientation control window is in the form of a slit which extends along a longer edge of the pixel electrode in an area corresponding to the center part of the pixel electrode, and forks at both longitudinal ends of the pixel electrode toward areas corresponding to corner sections of the pixel electrode.

Such a configuration of the pixel electrodes enlarges an area where the liquid crystal molecules are oriented in the same direction, while decreasing the influence at edge sections of the pixel electrodes by means of the combination of the orientation control window and the pixel electrodes. This also improves a viewing angle characteristic and a transmittance of the display, and reduces an average response time.

DESCRIPTION OF THE PREFERRED EMBODIMENT

Figure 1:
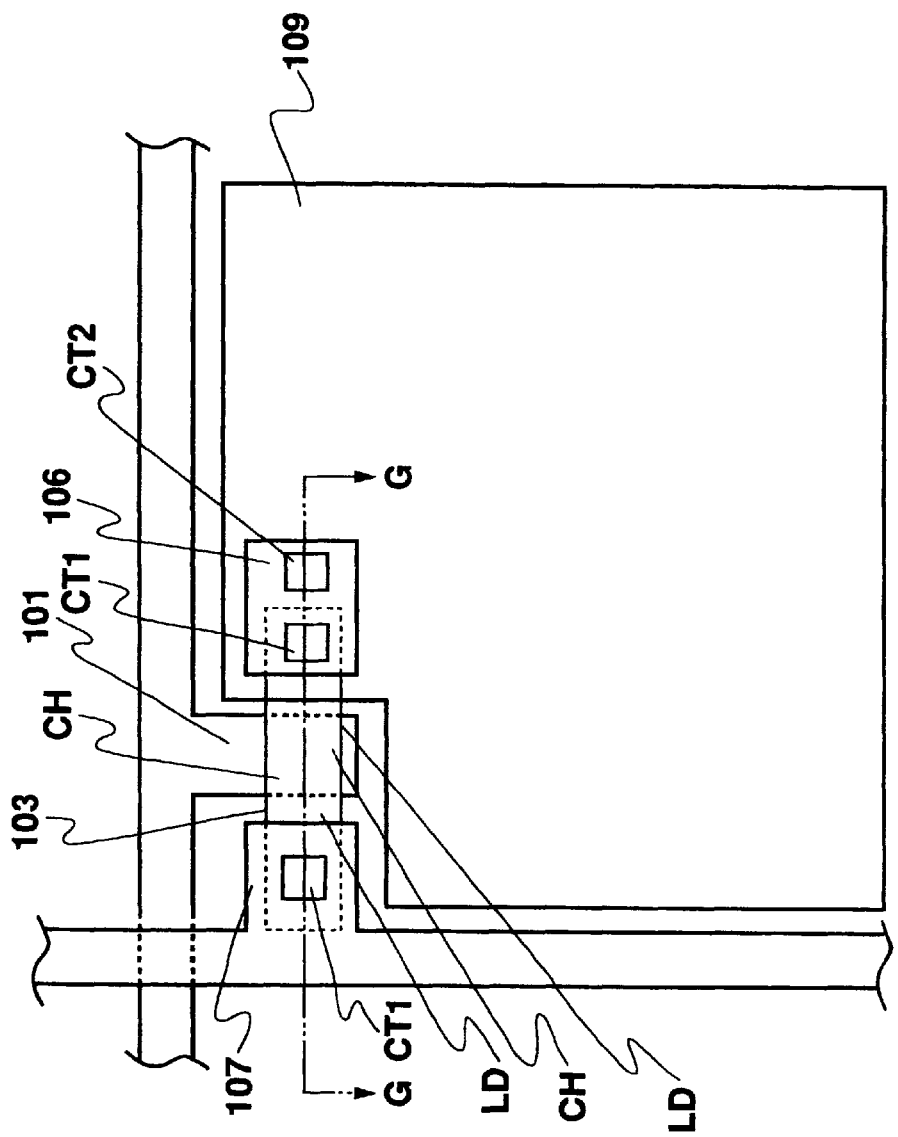
FIG. 1 is a plan view showing a unit pixel of a conventional liquid crystal display.
Figure 2:
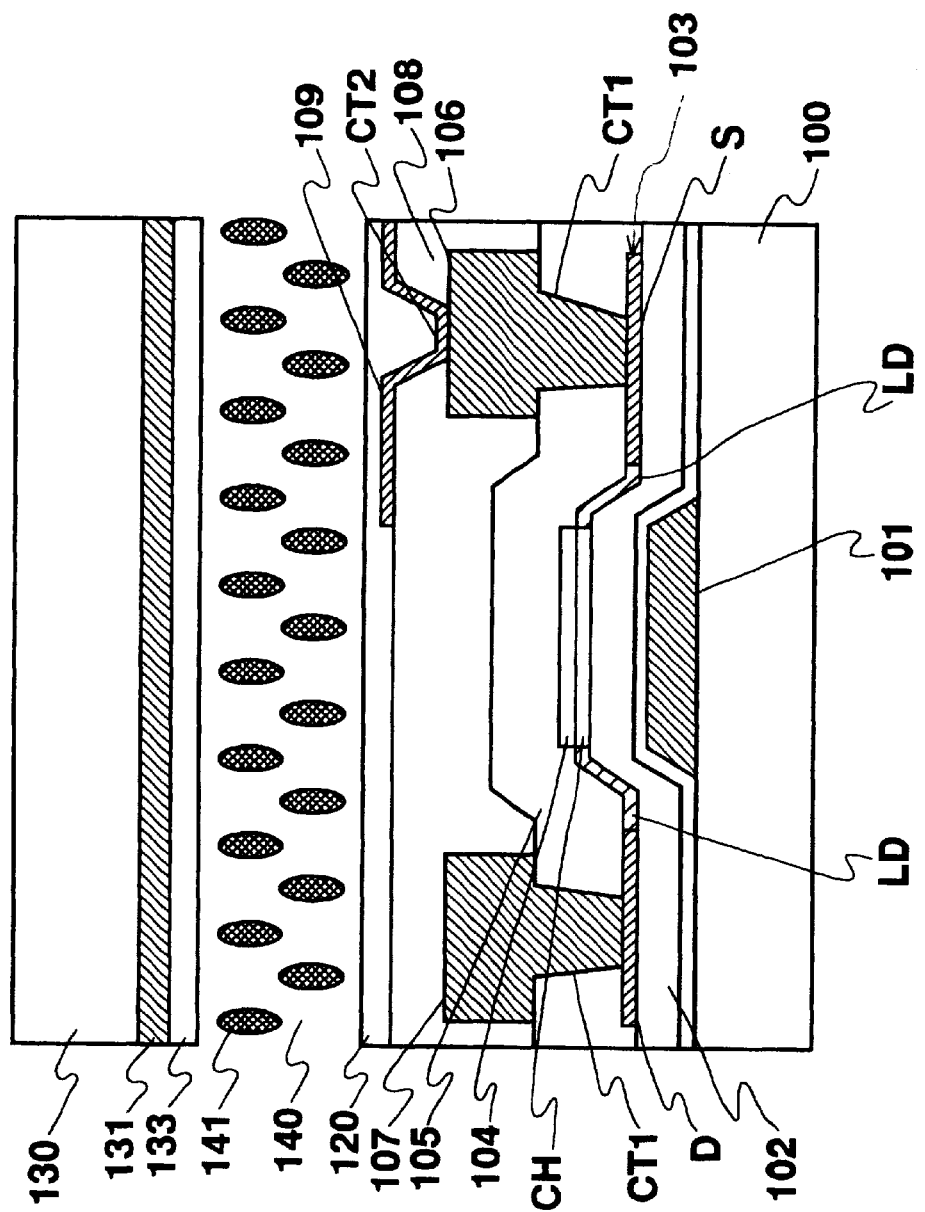
FIG. 2 is a sectional view taken along line G—G of FIG. 1.
Figure 3:
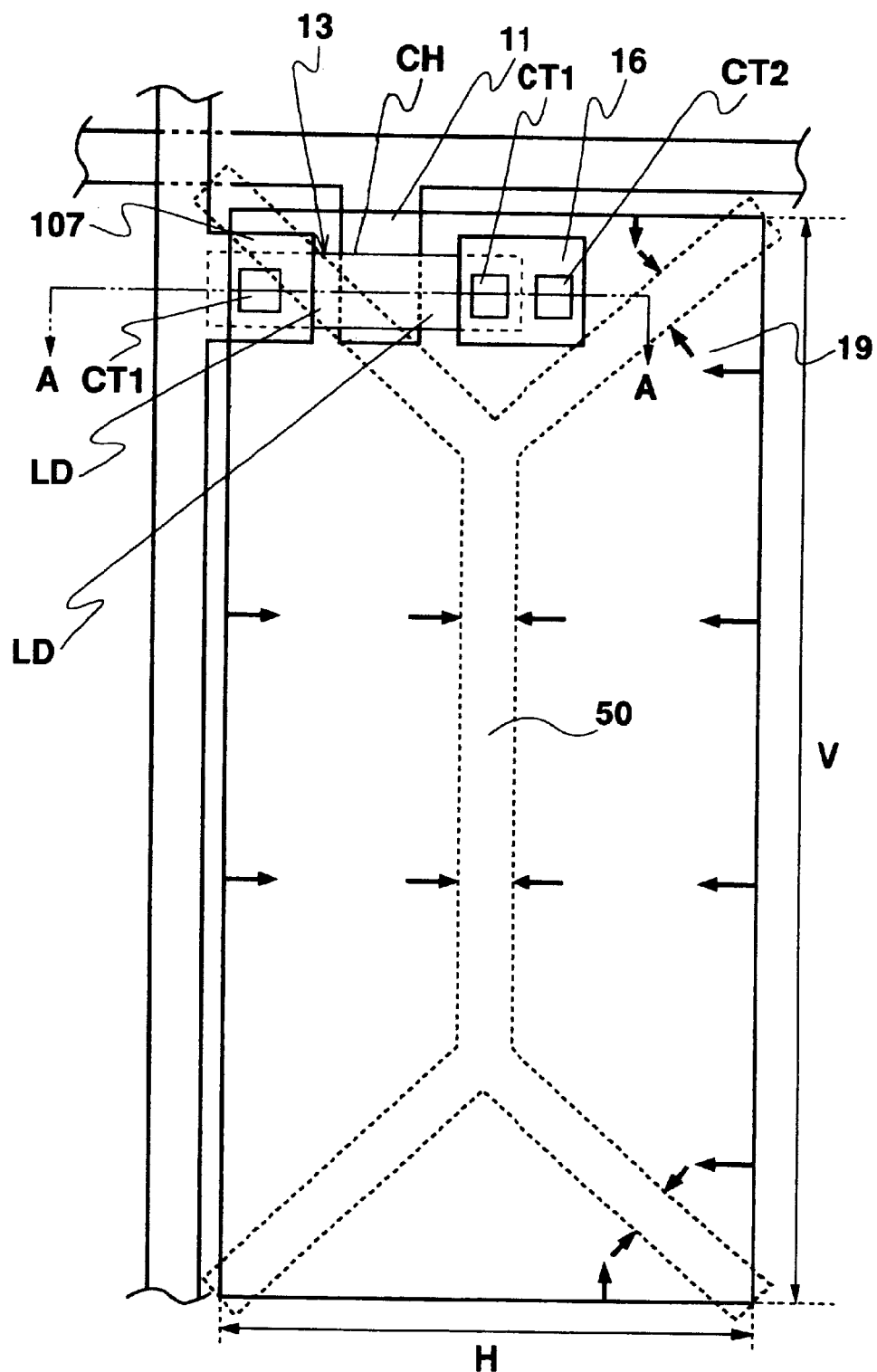
FIG. 3 is a plan view showing a unit pixel of a liquid crystal display according to the present invention.
Figure 4:
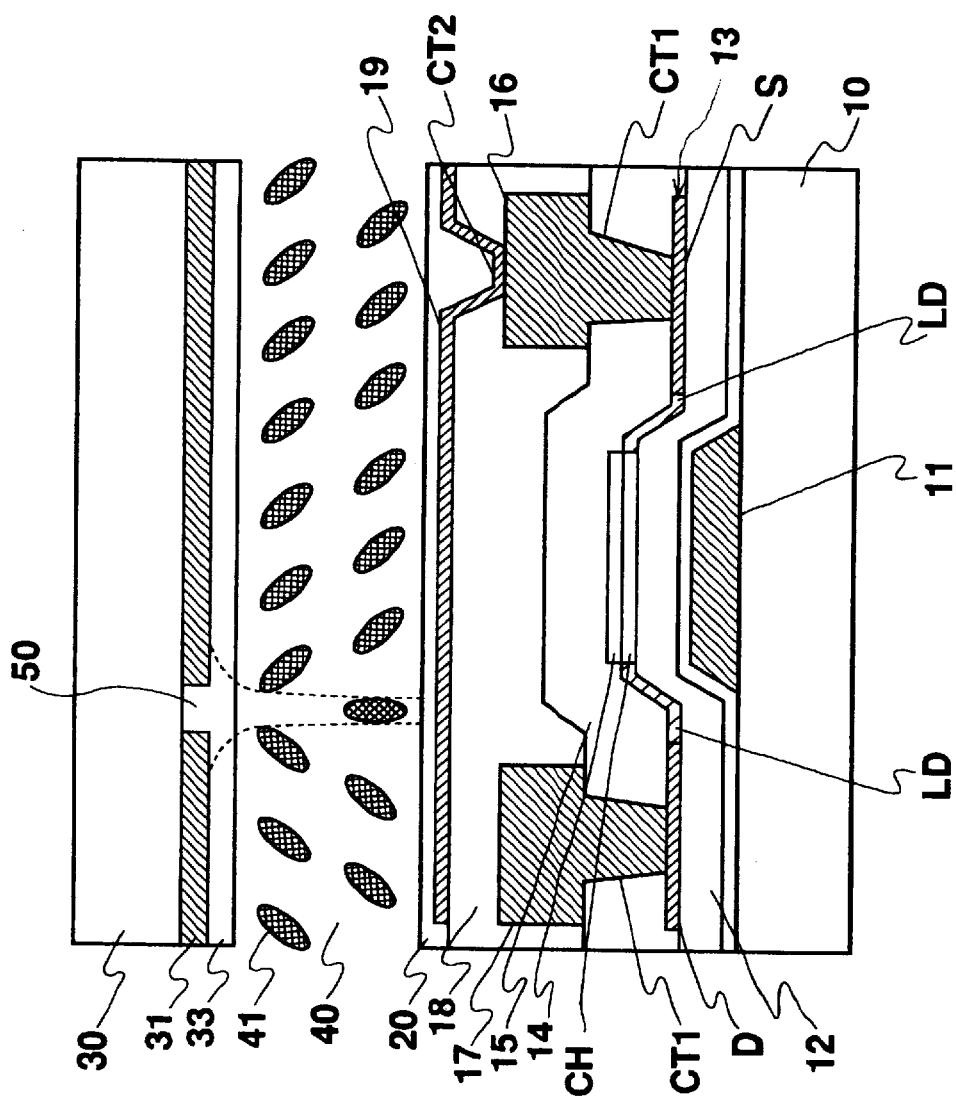
FIG. 4 is a sectional view taken along line A—A of FIG. 3.

Referring to FIGS. 3 and 4, a unit pixel structure of a liquid crystal display according to the present invention is shown, wherein FIG. 3 is a plan view and FIG. 4 is a sectional view taken along line A—A of FIG. 3. A gate electrode 11 made of a metal, such as Cr, Ta, or Mo, is formed on a substrate 10, and a gate insulating film 12 made of, e.g., SiNx and/or SiO$_2$ is formed to cover the gate electrode 11. The gate insulating film 12 is covered with p-Si 13 in which an implantation stopper 14 is used to form a lightly doped region (LD) having a low concentration (N−) of impurities, such as P or As, and source and drain regions (S, D) having a high concentration (N+) of impurities located outside the LD region. A region located immediately below the implantation stopper 14 is an intrinsic layer which includes substantially no impurities and acts as a channel region (CH). The p-Si 13 is covered with an interlayer insulating film 15 made of SiNx or the like. A source electrode 16 and a drain electrode 17, both made of a material such as Al, Mo, or the like, are formed on the interlayer insulating film 15, each electrode being connected to the source region S and the drain region D, respectively, via a contact hole CT1 formed in the interlayer insulating film 15. The entire surface of the thus formed TFT is covered with a planarization insulating film 18 made of SOG (spin on glass), BPSG (boro-phospho silicate glass), acrylic resin, or the like. A pixel electrode 19 made of ITO (indium tin oxide) or the like is formed on the planarization insulating film 18 for actuating the liquid crystal, and is connected to the source electrode 16 via a contact hole CT2 formed in the planarization insulating film 18.

An orientation film 20 formed by a macro molecular film, such as polyimide, is formed on the entire surface of the above elements, while a common electrode 31 made of ITO is formed on the entire surface of another glass substrate 30 arranged opposite to the substrate 10 across a liquid crystal layer. The common electrode 31 is covered with an orientation film 33 made of polyimide or the like. In the present invention, the orientation films 20, 33 and the liquid crystal 40 are selected so that liquid crystal molecules 41 are aligned vertically.

In addition, an orientation control window 50 is formed in the common electrode 31 facing the pixel electrode 19, the window being in the form of two upper and lower Y-shaped slits connected symmetrically to each other. Specifically, this window 50 is in the form of a slit which extends in a straight line along a longer edge of the pixel electrode 19 in an area corresponding to the center part of the pixel electrode 19, and forks at an area corresponding to both longitudinal ends of the pixel electrode 19 toward its corner sections. Since the electric field applied to the liquid crystal molecules 41 located below the orientation control window 50 is not sufficiently strong to tilt those molecules 41, they have vertical alignment. Around these molecules 41, however, an electric field is created as indicated by a dotted line in FIG. 4, which controls the molecules 41 to direct their longer axes perpendicular to the applied field. This is also true at the edge sections of the pixel electrode 19 and the longer axes of the liquid crystal molecules 41 are oriented perpendicularly to the electric field. The tilt of these molecules is propagated to other molecules located in the interior of the layer because of continuity of the liquid crystal. Thus, the liquid crystal molecules are oriented in substantially the same direction in the center part of the pixel electrode 19, although the orientation is uneven in the vicinity of the edge sections. Better viewing angle characteristic and transmittance are achieved with such an orientation.

Figure 5:
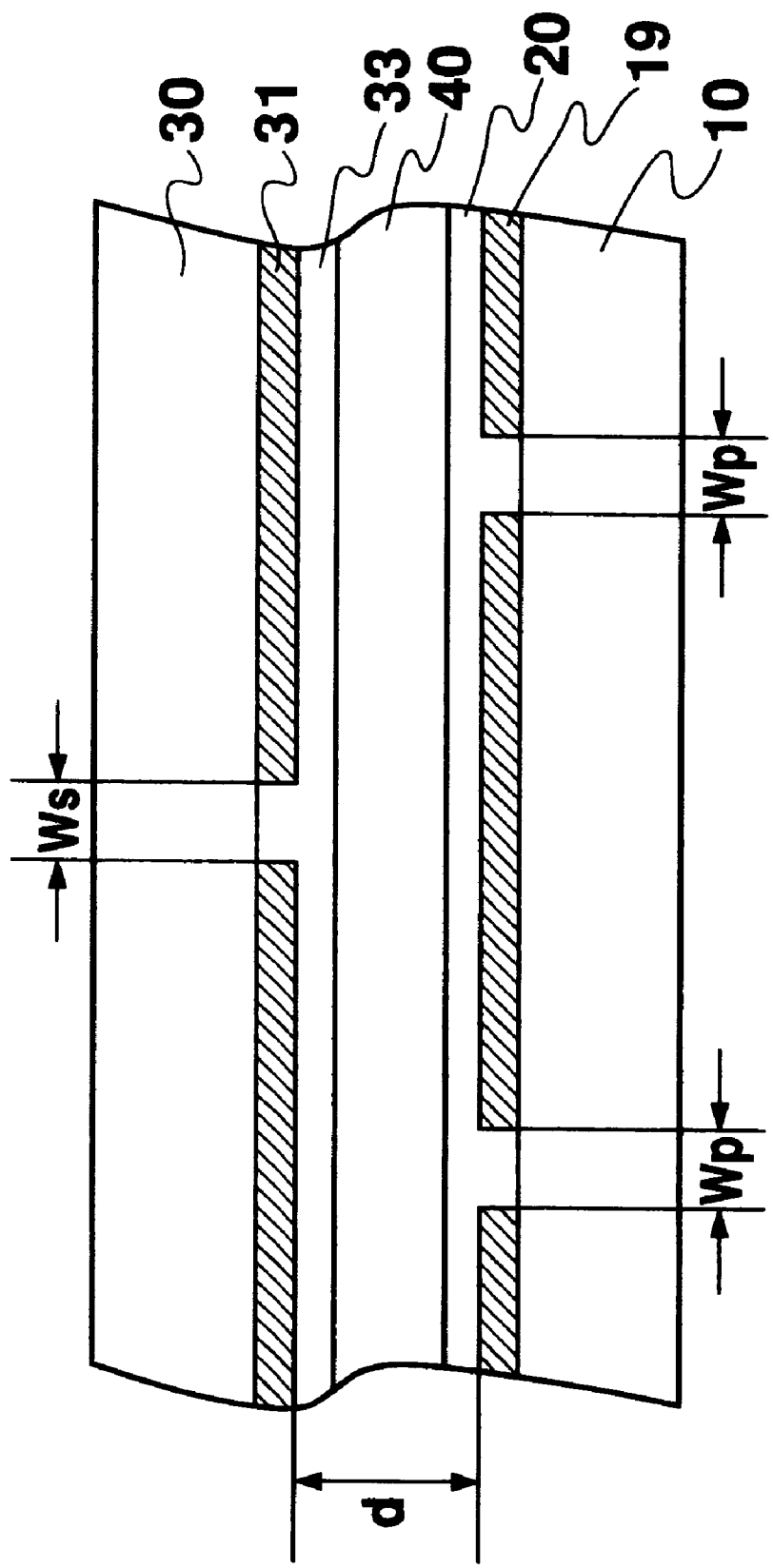
FIG. 5 an explanatory diagram showing a distance Wp between the pixel electrodes, a cell gap d, and a slit width Ws.

Referring to FIG. 5, to achieve a stable orientation in the vertically aligned liquid crystal molecules 41, it is necessary to appropriately determine a distance Wp which is a distance between adjacent pixel electrodes 19, a cell gap d which is a distance between the pixel electrodes 19 and the common electrode 31, and a slit width Ws which is a width of the orientation control window 50 of the common electrode 31.

Figure 6A:
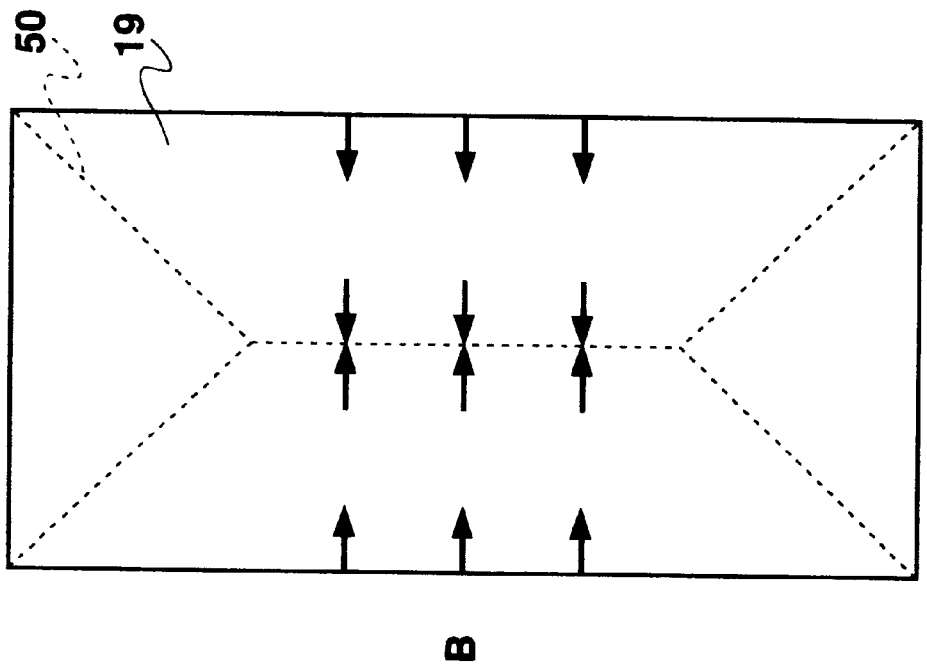
FIGS. 6A and 6B are explanatory diagrams showing the tilt of liquid crystal molecules in an extraordinary state and an ordinary state, respectively.
Figure 6B:
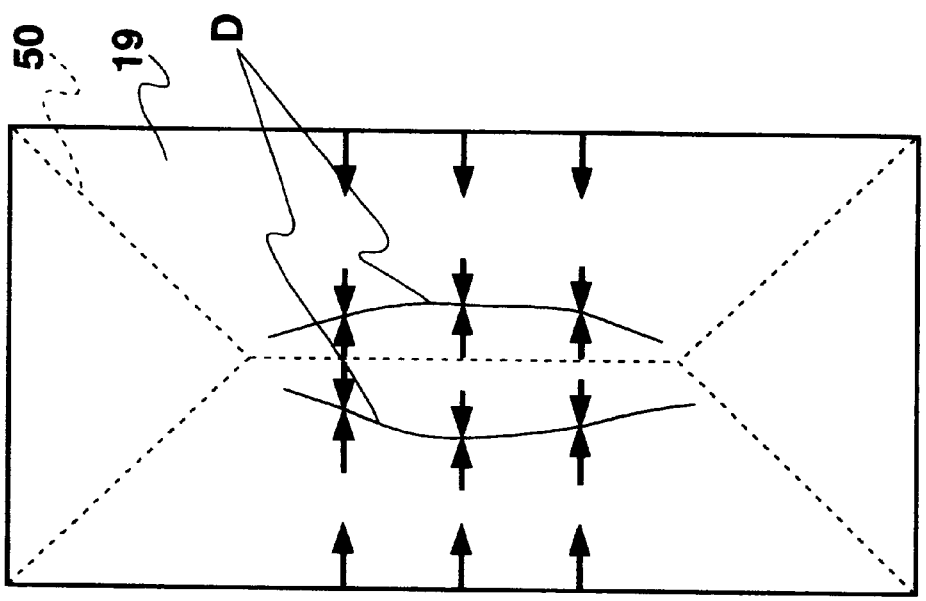

FIG. 6A illustrates liquid crystal molecules 41 with abnormal orientation, while FIG. 6B illustrates normally oriented liquid crystal molecules 41. Unless the above-mentioned distance Wp, the cell gap d, and the slit width Ws are appropriately selected, disclination lines D which represent the abnormal orientation are created at such locations as shown in FIG. 6A. The tilt direction of the liquid crystal molecules should essentially be uniform and to the left on the right hand side and to the right on the left hand side of the orientation control window 50, as indicated by solid line arrows of FIG. 6B. In contrast, the liquid crystal molecules of FIG. 6A are tilted so as to run into each other from both sides, and disclination lines D are created at the interface between the opposing molecules on either side of the orientation control window 50. The disclination lines D look like a stripe pattern on the display, and randomly appear at different locations depending on the positions of pixels. This causes grittiness of an image, such as scattering white sands on a black image.

To solve this, the present invention utilizes a condition defined by expression (1) below from the following experimental results:

$$Ws \geq d/2 \quad (1)$$

where Ws is a slit width, and d is a cell gap.

In the experimental results, X represents an unstable state and ○ represents a stable state.

| Experimental Results | | | | | |
|---|---|---|---|---|---|
| When d = 3 μm (Wp = 3 μm): | | | | | |
| Ws [μm] | 1 | 1.5 | 2 | 3 | 4 |
| Orientation Stability | X | ○ | ○ | ○ | ○ |
| When d = 4 μm (Wp = 4 μm) | | | | | |
| Ws [μm] | 1.5 | 2 | 3 | 4 | 5 |
| Orientation Stability | X | ○ | ○ | ○ | ○ |
| When d = 5 μm (Wp = 5 μm) | | | | | |
| Ws [μm] | 2 | 3 | 4 | 5 | |
| Orientation Stability | X | ○ | ○ | ○ | |
| When d = 6 μm (Wp = 6 μm) | | | | | |
| Ws [μm] | 2 | 3 | 4 | 5 | |
| Orientation Stability | ○ | ○ | ○ | ○ | |
| When d = 8 μm (Wp = 8 μm) | | | | | |
| Ws [μm] | 2 | 3 | 4 | 5 | |
| Orientation Stability | X | X | ○ | ○ | |

Wp: distance between adjacent pixel electrodes

From these results, it is found that the occurrence of the above-mentioned abnormal orientation is prevented when the above expression (1) is satisfied.

With $Ws \geq d/2$ being satisfied, a condition for a relationship of Wp and d can be derived, as defined by expression (2) below:

$$Wp \geq d/2 \quad (2)$$

where Wp is a distance between adjacent pixel electrodes, and d is a cell gap.

The expression (2) is derived from the following experimental results, in which X represents an unstable state and ○ represents a stable state.

| Experimental Results | | | | | |
|---|---|---|---|---|---|
| When d = 3 μm (Ws = 3 μm): | | | | | |
| Wp [μm] | 1 | 1.5 | 2 | 3 | 4 |
| Orientation Stability | X | ○ | ○ | ○ | ○ |
| When d = 4 μm (Ws = 4 μm): | | | | | |
| Wp [μm] | 1.5 | 2 | 3 | 4 | 5 |
| Orientation Stability | X | ○ | ○ | ○ | ○ |
| When d = 5 μm (Ws = 5 μm): | | | | | |
| Wp [μm] | 2 | 3 | 4 | 5 | |
| Orientation Stability | ○ | ○ | ○ | ○ | |
| When d = 6 μm (Ws = 6 μm): | | | | | |
| Wp [μm] | 2 | 3 | 4 | 5 | |
| Orientation Stability | ○ | ○ | ○ | ○ | |
| When d = 8 μm (Ws = 8 μm): | | | | | |
| Wp [μm] | 2 | 3 | 4 | 5 | |
| Orientation Stability | X | X | ○ | ○ | |

From these results, it is found that the occurrence of the above-mentioned abnormal orientation is also prevented when the expression (2) is satisfied.

In this embodiment, an aspect ratio, i.e., a vertical to horizontal length ratio V/H of the pixel electrode 19 is selected to 2 or more. Setting as such, it is possible to enlarge an area where the liquid crystal molecules are oriented in the same direction, while decreasing an uneven orientation area. This allows the viewing angle characteristic, the transmittance, and even the response speed to be improved.

Figure 7A:
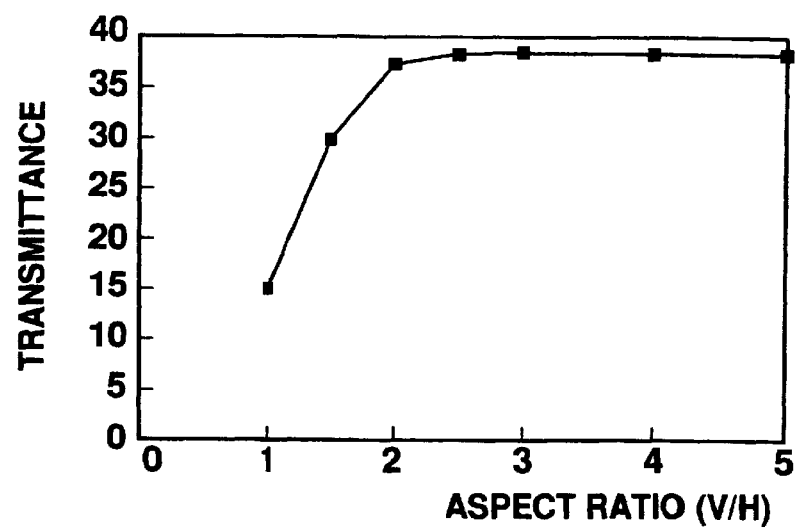
FIGS. 7A and 7B are graph plotting an aspect ratio V/H of the liquid crystal display as a function of a transmittance and an average response time, respectively, according to the present invention.
Figure 7B:
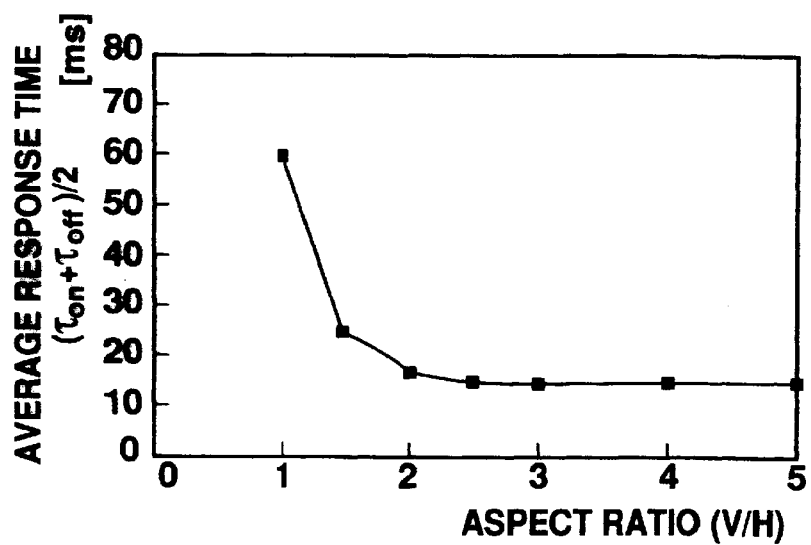

FIGS. 7A and 7B show the experimental results and plot an aspect ratio (V/H) of the pixel electrode 19 relative to its transmittance and average response time (($\tau$ on +$\tau$ off)/2), respectively. As shown in the graph of FIG. 7A, the transmittance was low until the aspect ratio reached 2, and then increased to a preferable value and remained on that value. As shown in the graph of FIG. 7B, the average response time was slow until the aspect ratio reached 2, and then accelerated and remained unchanged after that. Namely, at the aspect ratio V/H of the pixel electrode 19 equal to 2 or more, a higher transmittance and a reduced average response time were achieved.

What is claimed is:

1. A vertically aligned type liquid crystal display, comprising: a vertically aligned liquid crystal layer disposed between a plurality of pixel electrodes and a common electrode, the orientation of said liquid crystal layer being controlled by an electric field, the pixel electrode and/or the common electrode having an orientation control window which divides the liquid crystal into a plurality of orientation sections to broaden the viewing angle, wherein a relationship between a gap d formed between each of said plurality of pixel electrodes and said common electrode and a separation distance Wp between said individual pixel electrodes satisfies $Wp \geq d/2$, wherein said common electrode has an orientation control window in an area corresponding to each of said plurality of pixel electrodes, and wherein a ratio of vertical to horizontal length of each of said plurality of pixel electrodes is equal to or more than 2.

2. The liquid crystal display according to claim 1, wherein said orientation control window is in the form of a slit which extends along a longer edge of said pixel electrode in an area corresponding to the center part of said pixel electrode, and forks at both longitudinal ends of said pixel electrode toward areas corresponding to corner sections of said pixel electrode.

3. A vertically aligned type liquid crystal display, comprising:

a vertically aligned liquid crystal layer disposed between a plurality of pixel electrodes and a common electrode, the orientation of said liquid crystal layer being controlled by electric field, said common electrode having an orientation control window in an area corresponding to each of said plurality of pixel electrodes, wherein the orientation control windows divides the liquid crystal into a plurality of orientation sections to broaden the viewing angle, wherein a relationship between a gap d formed between each of said plurality of pixel electrodes and said common electrode and a separation distance Wp between said individual pixel electrodes and a width Ws of said orientation control window satisfies $Wp \geq d/2$ and $Ws \geq d/2$, and wherein a ratio of vertical to horizontal length of each of said plurality of pixel electrodes is equal to or more than 2.

4. The liquid crystal display according to claim 3, wherein said orientation control window is in the form of a slit which extends along a longer edge of said pixel electrode in an area corresponding to the center part of said pixel electrode, and forks at both longitudinal ends of said pixel electrode toward areas corresponding to corner sections of said pixel electrode.

5. A vertically aligned type liquid crystal display, comprising:

a vertically aligned liquid crystal layer disposed between a plurality of pixel electrodes and a common electrode, the orientation of said liquid crystal layer being controlled by an electric field, the pixel electrode and/or the common electrode having an orientation divider which divides the liquid crystal into a plurality of orientation sections through an interaction with an end portion of the pixel electrode to broaden the viewing angle, wherein a relationship between a gap d formed between each of said plurality of pixel electrodes and said common electrode and a separation distance Wp between said individual pixel electrodes satisfies $Wp \geq d/2$, wherein said common electrode has the orientation divider in an area corresponding to each of said plurality of pixel electrodes, and wherein a ratio of vertical to horizontal length of each of said plurality of pixel electrodes is equal to or more than 2.

* * * * *